United States Patent [19]

Ziegler

[11] Patent Number: 4,488,013

[45] Date of Patent: Dec. 11, 1984

[54] TELEPHONE PEDESTAL ENCAPSULATING SPLICE HOUSING

[76] Inventor: Hans J. Ziegler, 4828 N. Newhall St., Milwaukee, Wis. 53217

[21] Appl. No.: 494,973

[22] Filed: May 16, 1983

[51] Int. Cl.³ .............................................. H04M 3/26
[52] U.S. Cl. ........................ 179/175.1 R; 179/175.25; 179/98; 174/50.52; 174/51; 200/158; 339/14 RP
[58] Field of Search .................... 179/175.1 R, 175.25, 179/175, 178, 179, 98; 200/158; 361/356, 428, 429; 174/92, 51, 50.52, 65 R; 339/14 L, 14 RP

[56] References Cited

U.S. PATENT DOCUMENTS

| | | | |
|---|---|---|---|
| 3,524,960 | 8/1970 | Lohff | 200/158 |
| 3,714,369 | 1/1973 | Bunten | 361/356 |
| 3,864,510 | 2/1975 | Ramsey et al. | 175/51 |

Primary Examiner—Stafford D. Schreyer

[57] ABSTRACT

An improved method and apparatus for joining service wires to selected wire pairs of a loop of telephone cable housed in a telephone closure or pedestal. The invention provides a splice housing adapted to be positioned in the pedestal and adapted to house a loop of the telephone cable. The splice housing also includes an integral divider plate portion adapted to support one or more terminal blocks in a variety of arrangements and combinations and also to support a disconnect block adapted to permit connection and disconnection of the cable shields to ground and a ground clamp adapted to permit connection of the cable shields to ground and to permit connection of the shields of the service wires to ground.

25 Claims, 12 Drawing Figures

TELEPHONE PEDESTAL ENCAPSULATING SPLICE HOUSING

FIELD OF THE INVENTION

The invention relates to telephone distribution closures or pedestals and more particularly to apparatus for use in encapsulating splices of telephone cables within such pedestals. The invention also relates to apparatus for grounding electrically conductive shields of cables such as telephone cables and service wires.

BACKGROUND PRIOR ART

Telephone distribution closures or pedestals are used to provide a splice housing or are adapted to contain splices of telephone service wires. The pedestals normally house a loop of buried cable, and service wires are brought into the housing and connected to pairs of wires of the cable.

The conventional pedestal includes a pivotably mounted divider plate separating the vertical cavity of the pedestal into a rearward cavity portion and a forward cavity portion. The rearward cavity portion is adapted to house a vertically extending loop of telephone cable. The divider plate is pivotable to an open position to permit access to the rearward cavity portion.

In practice, the insulation and electrically conductive shield of the cable are stripped from a portion of the cable loop to thereby expose the wires of the cable. A terminal block is mounted on the divider plate, and wires are spliced to selected pairs of the wires of the cable and are connected to the terminal block. The service wires brought into the pedestal are then connected to the terminal block so as to provide electrical connection between the service wires and the selected wires of the buried cable.

During installation of service, a first serviceman or "splicer" attends to splicing of the cable, i.e. connection of selected ones of the wires of the cable to the appropriate terminals of the terminal block. The terminal block is mounted on the divider plate such that the splicing wires from the cable can be connected to the terminal block from the rearward side of the divider plate, and the service wires can be connected from the front side of the divider plate. In practice, it is preferred that once the "splicer" has completed the splicing operation, the divider plate will be moved to its closed position to preclude access to the splice. A second serviceman or "installer" will then attend to connection of the service wires to the terminal block.

In practice, if an installer makes an error in connection of the service wires to the terminal block, he may seek to correct his error by opening the divider plate and connecting an additional pair of wires of the cable to the terminal block. This results in errors in record keeping for the telephone service company and can produce a tangle of wires in the splice area, i.e. "poor housekeeping."

Another common problem in connection with splicing of telephone cables in pedestals is that moisture, plant growth, insects and animals may attack the splice connections within the pedestal thereby causing deterioration, and degradation of the conductor insulation is commonly caused by heat in the pedestals and exposure of the conductor insulation to ultraviolet light. Rehabilitation of the wiring in the pedestals is a costly program for nearly all telephone service companies.

Another common problem in connection with splicings in telephone closures or pedestals is that due to the large number of wire pairs normally involved, the splice may yield a mass of tangled wires and housekeeping problems.

The prior art methods of splicing have sought to correct some of the problems associated with "housekeeping" of this mass of wires and in connection with protecting the wires from deterioration. These prior art efforts have generally included methods of wrapping the completed splice in a casing or plastic bag and then pouring an encapsulating material into the bag. Another prior art method for protecting the splice includes the steps of covering the splice with a heat shrinkable plastic sleeve and then heating the sleeve with a torch to cause it to form a tight enclosure around the spliced wires. Both of these prior art methods tend to require a great deal of additional labor, and in the case of the heat shrinkable sleeve method, damage to the splice can result if the heat shrinkable wrap or sleeve is not properly heated.

Telephone communication and transmission cables and service lines also normally include an electrically conductive shield surrounding the wires of the cables or services wires and intended to protect these wires from electrical interference. In the installation of such cables and service wires, it is common practice to provide means for grounding these electrically conductive shields of the cables at selected locations along the cables. The prior art apparatus for grounding the electrically conductive shields commonly includes a ground strap having one end connected to the cable shield by a bond clamp, and an opposite end of the ground strap is bolted to a ground wire or ground rod housed in the telephone distribution closure or pedestal.

It is also commonly desirable to test the continuity of the electrically conductive shields of telephone cables by disconnecting the cables from ground and connecting test probes to the cable shields. With the prior art arrangements, each ground strap must be released from the ground rod before it can be tested and then following testing, it must again be bolted to the ground rod.

Conventional telephone cable pedestals also house ground brackets for use in grounding the electrically conductive shields of service wires coming into the pedestal and being connected to the terminal block. One prior art clamp arrangement for use in joining a number of service wires together and for connecting the electrically conductive shields of those services wires to a ground rod or ground wire is illustrated in the U.S. Sterling Pat. No. 4,136 423 issued Jan. 30, 1979.

One of the features of the prior art service wire clamp arrangements, such as that shown in the Sterling patent is that it is necessary to insert the cables from a rearward portion of the clamp assembly and then tighten a bolt or screw which is on a forward or front side of the bracket or clamp assembly. Accordingly, the operator must have access to both the rearward and the front side of the cable clamp assembly. Additionally, since the cables must be inserted into the clamp assembly from the rearward side of the bracket or clamp assembly where access may be limited, placement or arrangement of the wires in the bracket assembly may be difficult and time consuming.

SUMMARY OF THE INVENTION

The present invention provides an improved method and apparatus for joining service wires to selected wire pairs of a loop of telephone cable housed in a telephone closure or pedestal. The invention provides a splice housing adapted to be positioned in the pedestal and adapted to house a loop of the telephone cable. The splice housing also includes an integral divider plate portion adapted to support one or more terminal blocks in a variety of arrangements and combinations and also to support a ground clamp adapted to permit connection of the cable shields to ground and to permit connection of the shields of the service wires to ground.

One of the features of the present invention is that the splice housing is conveniently manufactured by vacuum forming a single piece of sheet plastic material. The splice housing is thus inexpensive to manufacture since it can be formed of relatively inexpensive material and it can be produced without costly tooling.

Another feature of the invention is that the splice housing can be easily filled with encapsulant to thereby protect the electrical connections of the splice. The splice housing provides a ready encapsulant container and the splicer is not required to spend additional effort in wrapping the splice with plastic wraps or plastic bags used to contain encapsulant.

The splice housing is also constructed in such a manner as to support the cable and splice wires so as to aid in or encourage good housekeeping in the splice.

Another feature of the splice housing of the invention is that it can be clamped or locked shut such that once the splice has been completed and the encapsulant has been poured into the splice housing, the housing can be closed so as to discourage tampering by unauthorized persons.

Another feature of the splice housing is that it functions to provide a divider plate. The conventional pivotable metal divider plate and hinge mechanisms in the prior art pedestals can be eliminated and thereby reduce the cost of the pedestal. The divider plate or face plate of the splice housing of the invention is also constructed of materials which can be readily pierced by a sharp object such as a screwdriver. The splicer can form the necessary holes in the divider plate to mount the terminal blocks in the desired location and arrangement. Accordingly the same divider plate can be used for a variety of installations.

Another feature of the invention is the provision of a ground disconnect block supported by the divider plate. The ground disconnect block includes at least a pair of terminals extending from the rearward face of the divider plate and adapted to be connected to ground straps in turn connected to the electrically conducting shields surrounding the cable. The ground disconnect block is also adapted to be connected to a ground rod or ground wire so as to ground the cable shields. The ground disconnect block includes means providing for convenient disconnection of the ground straps from the ground rod to thereby facilitate testing of the electrical conductivity of the cable shields. The ground disconnect block is also constructed and mounted in such a manner as to provide convenient access to the means for disconnecting the cable shield from ground.

The ground disconnect block also supports an improved ground bracket adapted to be positioned adjacent a forward surface of the divider plate and adapted to ground the electrically conductive shields of service wires connected to terminal blocks in the pedestal.

Various other features and advantages of the invention will be apparent by reference to the following description of a preferred embodiment, from the drawings and from the claims.

Before describing the preferred embodiment of the invention in detail, it is to be understood that the invention is not limited to the details of construction and to the arrangements of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

Figures 1, 9, 11:
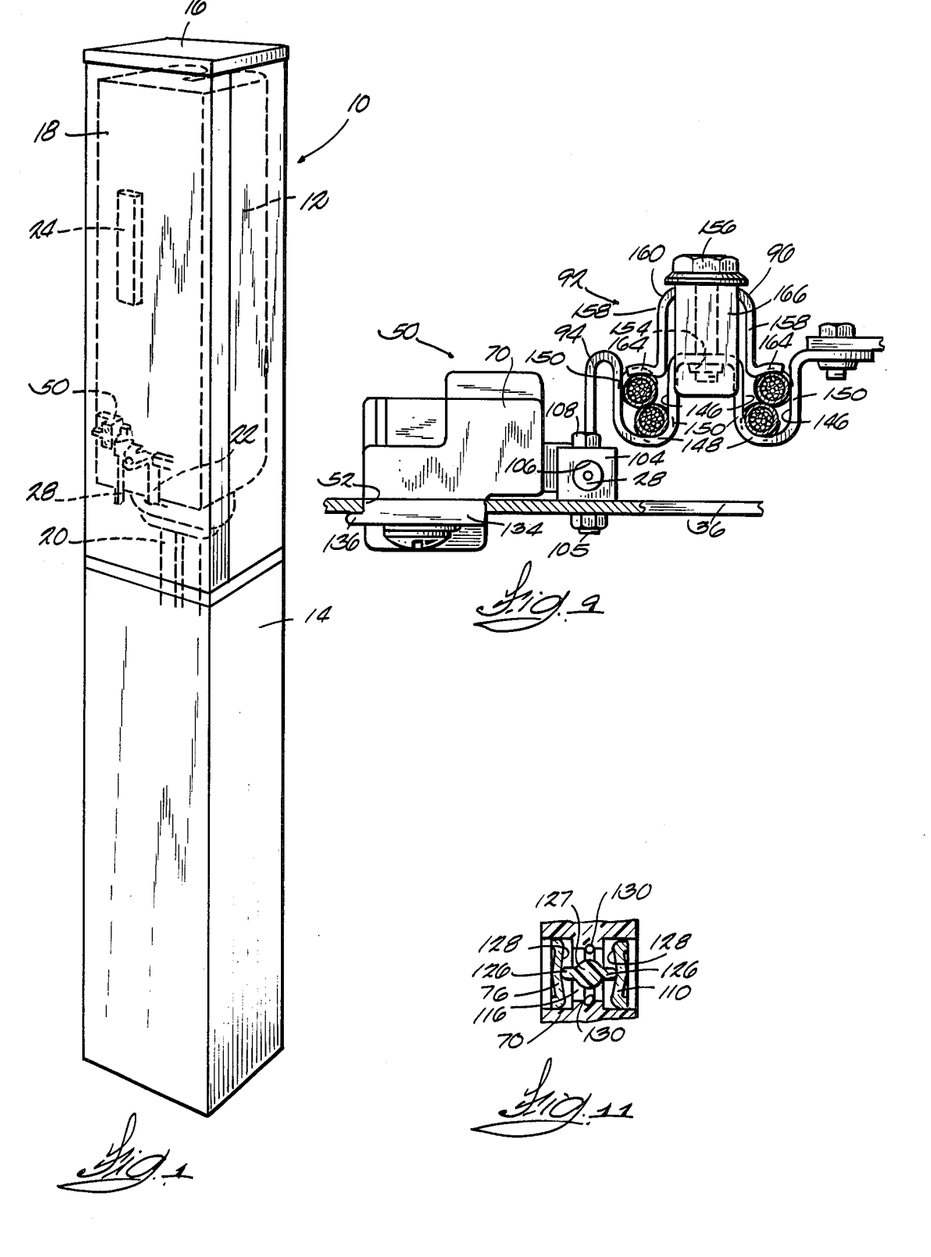
FIG. 1 is a perspective view of a telephone closure pedestal including an encapsulating splice housing embodying the invention.
FIG. 9 is an enlarged view of the ground disconnect block shown in FIG. 1.
FIG. 11 is a view taken along line 11—11 and FIG. 10.

Illustrated in FIG. 1 is a telephone distribution closure or pedestal 10 containing therein an encapsulating splice housing 12 embodying the invention. The telephone distribution pedestal 10 is conventional and comprises a generally vertical housing generally square in horizontal cross-section. Pedestals of the type illustrated in FIG. 1 are commonly constructed of sheet metal and include a rear wall and a pair of side walls 14 extending forwardly from the opposite sides of the rear wall. The upper end of the pedestal is closed by a cap 16, and the pedestal also commonly includes a front cover 18 which is removable to permit access to the interior of the pedestal 10. The lower end of the pedestal 10 is intended to be embedded in the ground. The function of the pedestal 10 is to house a loop of buried cable 20 which extends up into the pedestal 10 and also to provide a housing for connections between a plurality of service wires 22 and selected wire pairs of the loop of buried cable. The pedestal is also adapted to house one or more terminal blocks 24 and pairs of splice wires are connected in a conventional manner to selected wire pairs of the cable 20 and connected to terminals on the rearward side of the terminal block 24. The service wires 22 are connected to terminals on the front or forward side of the terminal block 24 to thereby provide electrical connection between the service wires 22 and the splice wires connected to the wire pairs of the cable 20.

The cable 20 and the service wires 22 also each include an electrically conductive shield surrounding the wires of the cable 20 and service wires 22, these electrically conductive shields being adapted to protect the wires of the cable and the service wires from electrical interference. The pedestal 10 also functions to house means for connecting these electrically conductive shields to a ground wire or ground rod 28.

As will be described more particularly hereinafter, the encapsulating splice housing 12 is adapted to be contained in the upper portion of the pedestal 10 and is particularly adapted to house the upper end of the loop of cable 20 and the splice wires which connect the selected wire pairs of the cable 20 to the terminal block 24. The encapsulating splice housing 12 also functions to provide means for supporting the terminal block or terminal blocks 24 as well as providing a means for supporting grounding apparatus adapted for use in grounding the electrically conductive shields of the cable 20 and service wires 22.

Referring more particularly to the construction of the encapsulating splice housing 12, it generally includes a clam shell design and in its preferred form, it is constructed of a vacuum formed plastic sheet. While the encapsulating splice housing 12 will be described as being vacuum formed of a relatively thin plastic material, it will be understood by those skilled in the art that the splice housing could be comprised of other suitable materials and be formed in other ways such as by injection molding, stamping, compression forming, or the like.

The encapsulating splice housing 12 includes a body portion or first clam shell portion 30 having a configuration complementary to the pedestal i.e., being adapted to be nested in the upper end of the pedestal 10. Stated alternatively, the body portion or first clam shell portion 30 of the encapsulating splice housing 12 includes a pair of sidewalls 32 joined by a rearward wall 34. The rearward wall 34 and sidewalls 32 are of such dimension as to be conveniently slideably inserted into the pedestal 10. The rearward wall 34 of the first clam shell portion can include flat surfaces adapted engaged the rear wall of the pedestal, and can be secured to the rear wall of the pedestal by a suitable adhesive or mechanical fastening means such as screws. In a preferred form of the invention, the body portion 30 of the splice housing also includes means for separating the cavity of the body portion into two separate generally vertical cavities 34 (FIG. 6), one of these vertical cavities 34 being adapted to house one leg of the loop of cable 22 and the other of the vertical cavities of the housing being adapted to house the other leg of the loop of the cable 20.

The splice housing 12 also includes a generally planar face plate 36 which is integrally joined in hinged relation to the forward edge of one of the sidewalls 32 of the body portion of the splice housing. The face plate 36 of the splice housing 12 is connected to the sidewall 32 in such a manner as to be relatively freely pivotably moveable with respect to the body portion 30 such that the splice housing 12 can be relatively easily opened or closed.

In a preferred form of the invention, the face plate 36 of the splice housing 12 has a configuration such that it can conveniently support one or more terminal blocks and structures to be described hereinafter for use in grounding the electrically conductive shields of the cable and service wires.

As previously stated, in a preferred form of the invention, the splice housing 12 is comprised of a single sheet of plastic material which is vacuum formed or otherwise shaped so as to form the illustrated configuration. It is also preferred that the splice housing 12 be comprised of material which is sufficiently soft that it can be punctured by a sharp object and cut relatively easily with a knife. An example of a suitable material is a high density polyethylene.

Figures 2, 3, 4:
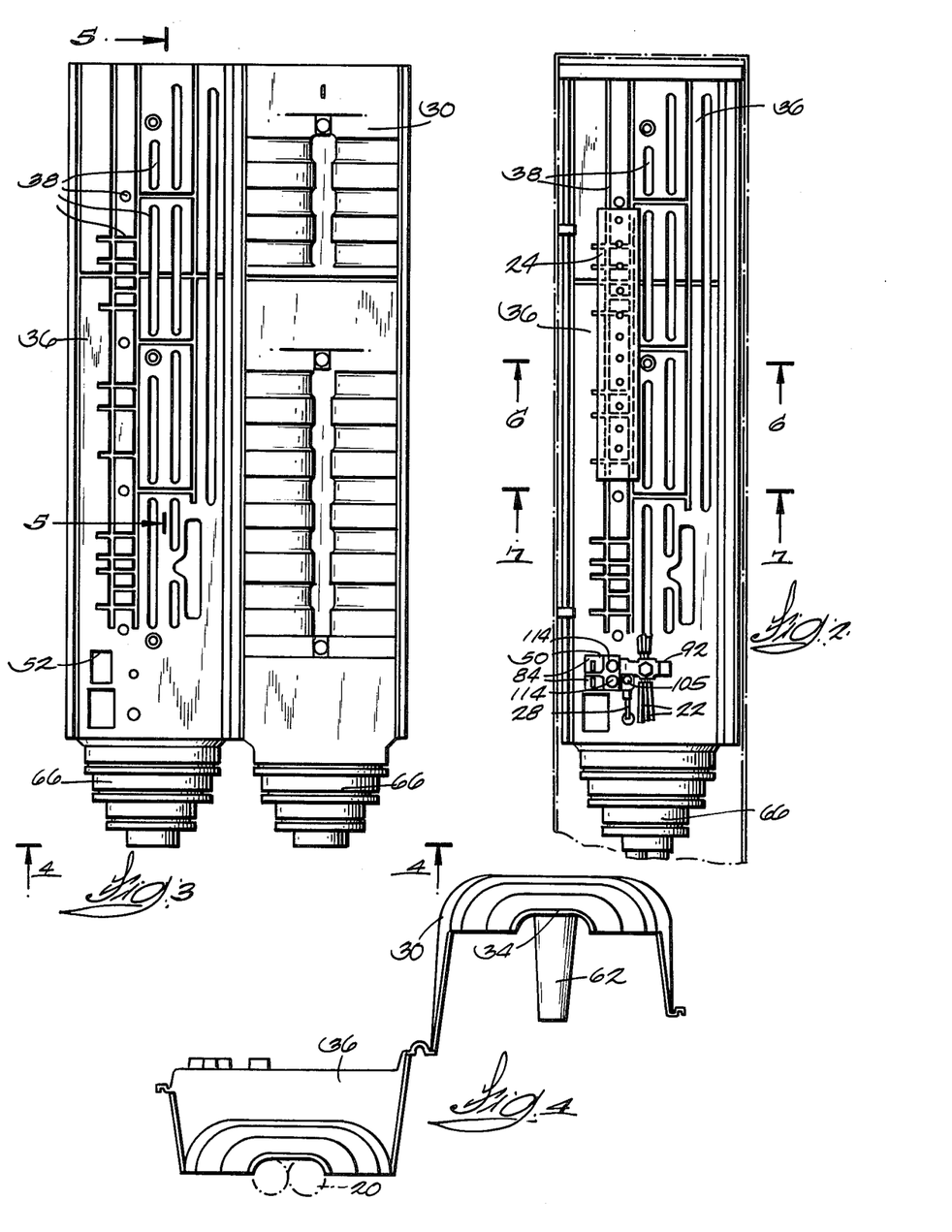
FIG. 2 is an enlarged elevation view of the encapsulating splice housing illustrated in FIG. 1.
FIG. 3 is a view similar to FIG. 2 but showing the encapsulating splice housing opened.
FIG. 4 is an end elevation view taken along line 4—4 in FIG. 3.
Figure 5:
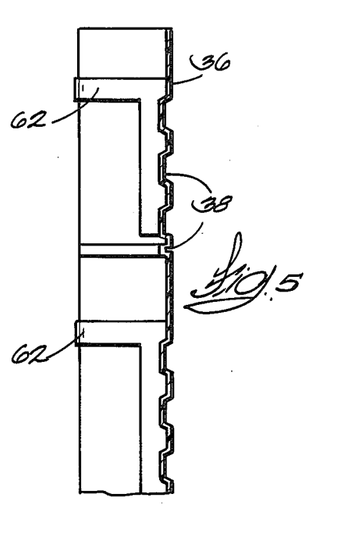
FIG. 5 is a cross-section view taken along line 5—5 and FIG. 3.

As illustrated in FIG. 3, the face plate 36 of the splice housing includes a plurality of indentations 38 formed in the front face of the splice housing and adapted to facilitiate mounting of one or more terminal blocks 24 on the face plate 36 in any position selected by the splicer. The plurality of indentations in the face plate are also intended to permit mounting of terminal blocks 24 of various sizes and shapes as selected by the splicer. Apertures for mounting of the teminal blocks are conveniently formed by either forcing a sharp object such as a screwdriver through the indentations 38 or by clipping off the protruding material from the rearward or inside of the face plate 36.

Figure 6:
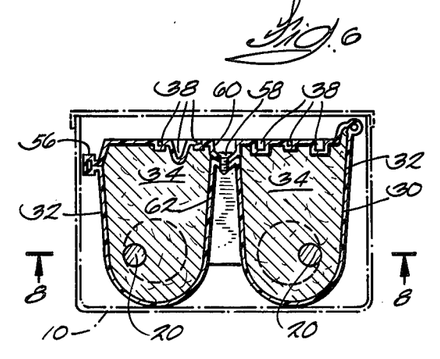
FIG. 6 is a cross-section view taken along line 6—6 and FIG. 2.
Figure 7:
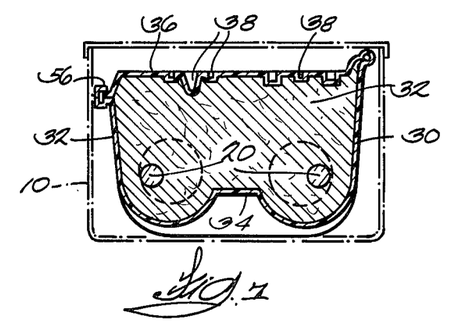
FIG. 7 is a cross-section view taken along line 7—7 and FIG. 2.
Figure 8:
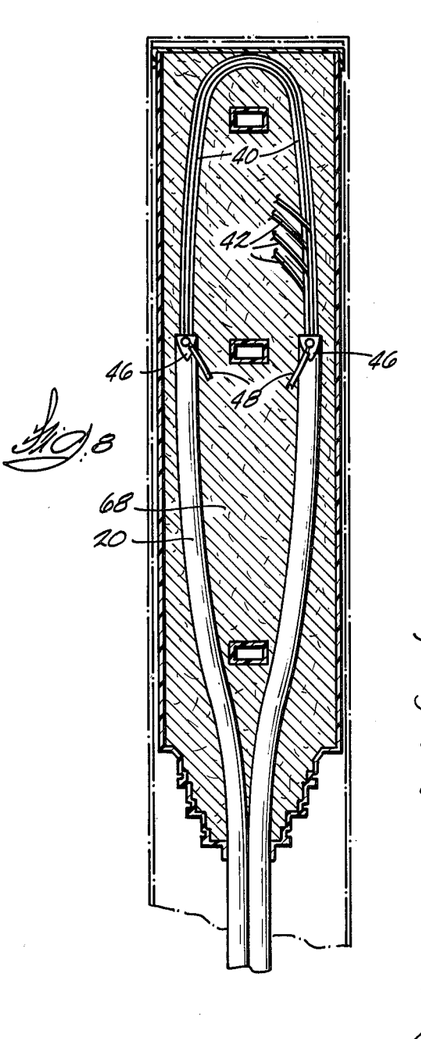
FIG. 8 is a cross-section view taken along line 8—8 and FIG. 6.

In the use of the encapsulating splice housing 12 the splice housing is inserted into the open pedestal 10 and the loop of cable 20 is laid into the first clam shell portion 30 of the splice housing as shown in FIGS. 6-8 with one leg of the cable loop on one side of the splice housing and the other leg of the cable loop being positioned on the opposite side of the splice housing. The insulative sheath and the electrically conductive shield of the upper portion of the cable loop are removed to expose the cable wires 40. While for purposes of illustration the cable 20 is shown as including only a few wires, it is well known to those skilled in the art that the cable would, in fact, include a large number of wire pairs. The splicer can then attach splice wires 42 to selected ones of the exposed wires 40 of the cable 20. The splicer will also mount selected terminal blocks 24 on the face plate 36 and the splice wires will then be connected to wires of the terminal block 24 which project through the face plate 36.

The splicer will also attach conventional bond clamps 46 to the electrically conductive shields of the cable 20 in a conventional manner and attach ground straps 48 to these bond clamps as illustrated in FIG. 8. The splicer will then mount a ground disconnect block 50 in the aperture 52 provided in the face plate. The free ends of the ground straps are adapted to be connected by screws to a rearward portion of the ground disconnect block housed in the aperture in the face plate 36 as best shown in FIGS. 2 and 3. The construction and operation will be described hereinafter.

Once the splicer has completed connection of the appropriate wire pairs 40 of the cable 20 to the terminal block 24 and attachment of the ground straps 48 to the cable shield and to the ground disconnect block 50, the splicer can close the encapsulating splice housing 12 and secure the face plate 36 in place by clamping or otherwise securing the edge 56 of the face plate 36 to the forward edge of the sidewall 32. In the illustrated construction the means for closing the face plate also includes a plurality of self-tapping screws 58 which extend indentations 60 and through the face plate 56 and are threaded into the forwardly projecting ends of bosses 62 of the first clam shell portion. The bosses also function to separate the cavity of the first clam shell portion into the pair of generally vertical cavities, one for housing one leg of the loop of cable and the other for housing the other leg of the loop of cable.

While it should be understood that the encapsulating splice housing could have other constructions, in the illustrated arrangement, the lower portion of the splice housing 12 is particularly constructed to include means for closely surrounding the cable 20 in such a manner as to grip the legs of the cable in a fluid tight relation. In order to accomplish this, the lower portion 66 of the encapsulating splice housing includes a generally conical configuration or tapered configuration such that the lower end of the housing includes an aperture only large enough to house the two legs of the cable. In a preferred form of the invention, the tapered conical lower end 66 of the housing 12 will be stepped. As previously stated, the material comprising the encapsulating splice housing is comprised of a material which is sufficently soft that it can be cut relatively easily. By providing the stepped conical lower end portion 66, the splice housing is adapted to house various diameters of cable by cutting off the selected amount of the lower conical end portion of the housing such that the opening formed to house the cable is of substantially the same size as the two legs of the cable.

Once the splicer has completed the splice and connection of the wire pairs 40 of the cable 20 to the rearward side of the terminal block 24, the splice housing can be closed and sealed. The splice housing is open at its upper end and can then be filled from the top with a fluid encapsulant 68 (FIG. 8) adapted to harden in the splice housing. While various encapsulants may be employed, suitable encapsulants include commercially available polyurethane encapsulants. Additionally, while the closed splice housing 12 may provide a fluid tight enclosure for the cable 20 and encapsulant, the splicer may elect to ensure fluid tight closure by winding the lower end of the splice housing and cable with electrical tape prior to filling the splice housing with encapsulant. Similarly, the seam line between the body portion 30 of the housing and the face place 36 can be also sealed with suitable tape.

One of the principal advantages of the present invention is that the splice housing 12 provides a convenient vessel for receiving encapsulant while also being easily opened so as to permit the splicer access to a cable 20 in the splice housing. Another of the principal advantages of the present invention is that the splice housing provides a self-contained divider plate is that the face plate 36 of the splice housing 12 can function as a divider plate for supporting the terminal blocks 24 and for supporting the ground disconnect block 50 to be described more particularly hereinafter. Accordingly, the conventional divider plate which is hingedly mounted in the telephone closure pedestal 10 can be eliminated, thereby reducing the manufacturing cost of the pedestal.

Figure 10:
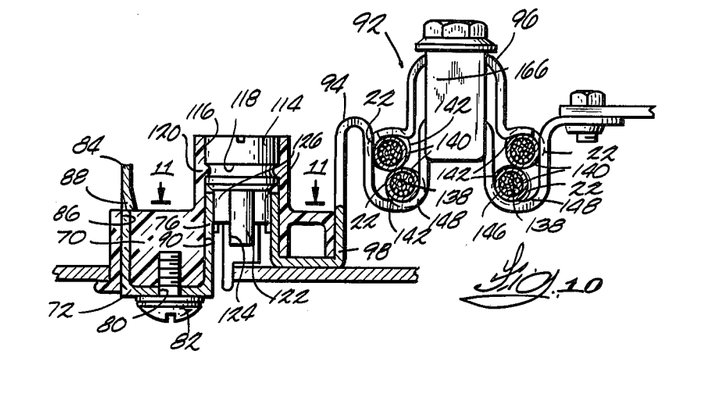
FIG. 10 is a view similar to FIG. 9 but showing the ground disconnect block partially in cross-section.
Figure 12:
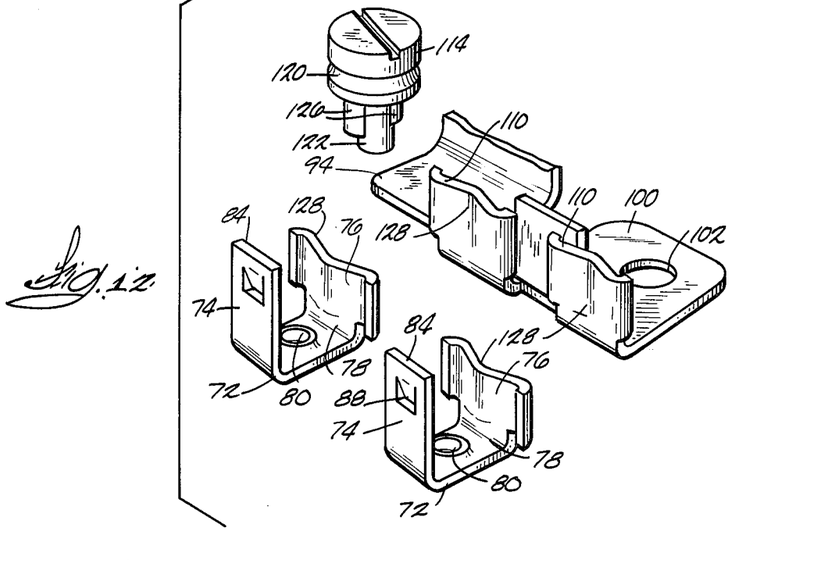
FIG. 12 is an exploded perspective view of the electrical contacts of the ground disconnect block shown in FIGS. 9–11.

Referring now more particularly to the ground disconnect block 50, while the ground disconnect block could have other constructions, in the particular arrangement illustrated the ground disconnect block includes a molded plastic body or block 70 particularly shaped so as to be conveniently attached or mounted on the front or forward face of the face plate 36 of the encapsulating splice housing 12. The ground disconnect block body 70 supports a pluratliy of electrically conductive elements or members as best shown in FIGS. 10-12. The electrically conductive members supported by the block include a pair of test contacts 72 best shown in FIGS. 10 and 12 and adapted to be fixed to the molded plastic block 70. While the test contacts 72 could have various constructions, in the illustrated arrangement, the test contacts each include a pair of spaced apart generally parallel legs 74 and 76 joined by a bite portion 78. The bite portion 78 includes an aperture 80 adapted to house a screw 82. As shown in FIG. 10, the test contacts 72 are inserted from a rearward side of the block 70 into cavities or apertures provided in the molded block. The forwardly extending free ends 84 of the legs 74 extend through apertures 86 so as to project from an opposite or front side of the block 70. In a preferred form of the invention, the legs 74 of the contacts 72 include an off-set central portion 88. As illustrated in FIG. 10, when the legs 74 of the test contacts 72 are forced into their respective apertures 86, and when the upset portion 88 moves completely through the block 70 it will spring into position precluding removal of the test contact 72 from the block 70. The forwardly projecting end 84 of the leg 74 of the test contact is then adapted to provide a testing member, or a test point, particularly adapted to be engaged by an electrical test probe as will be described.

As shown in FIG. 10, when the test contact 72 is forced into the block 70, the other leg 76 is adapted to be received or housed in an aperture 90 provided in the block and functions to provide a switch contact as will be discussed. Once the test contacts 72 are inserted into the block, the screw 82 can be inserted from a rearward side of the disconnect block through the aperture 80 and be threaded into the block 70. The screws 82 also provide a means for attaching the ground straps 48 to the test contacts 72. The ground disconnect block 70 also supports a ground bracket or ground clamp 92 fixedly joined to the ground disconnect block 70 and adapted to provide means for connecting, the electrically conductive shields of the service wires 22 to the ground wire or ground rod 28. While the ground bracket 92 could have other constructions, in the illustrated arrangement, the ground bracket 92 includes a ground clamp body or ground bracket body 94 comprised of an electrically conductive material such as brass. While the specific structure of the ground bracket body 94 will be described in greater detail hereinafter, the ground bracket body includes one end adapted to support a clamp member 96 for clamping the service wires 22 to the ground bracket body 94 and an opposite end portion 98 (FIG. 10) of the ground bracket body 94 has a configuration particularly adapted to permit it to be joined to the ground rod or ground wire and also constructed so as to permit the ground bracket body 94 to be joined in snap fit relation to the ground disconnect block 70. More particularly, the end portion 98 of the ground bracket body 94 adapted to be connected to the ground rod 28 is shaped so as to include a planar boss portion 100 having a bore 102. A ground rod bracket 104 (FIG. 9) can be joined to the boss 100 by a bolt 105 extending through the bore 102. The ground rod or ground wire 28 is in turn housed in a bore 106 in the ground rod bracket 104 and secured therein by a bolt 108.

The ground bracket body 94 also includes a pair of electrical contacts 110 (FIG. 12) integrally joined to the boss portion 100 of the ground bracket body 94 and adapted to be slideably housed in the cavities 90 provided in the ground disconnect block 70. More particularly one of the electrical contacts 110 is adapted to be slideably forced into one of the cavities 90 in the ground disconnect block 70 and so as to be in opposed spaced apart relation from one of the legs 76 of one of the test contacts 72 and the other electrical contact 110 of the ground bracket body 94 is adapted to be slideably forced into the other cavity 90 in the block 70 so as to be in opposed spaced apart relation with respect to the leg 76 of the other test contact 72.

Means are also provided for causing the ground bracket body 94 to be firmly supported by the block 70 when the electrical contacts 110 are forced into the cavities. Means are also provided for selectively electrically connecting the leg 76 of one of the test contacts 72 to one of the legs 110 of the ground bracket body 94, and similar means are provided for selectively electrically connecting the leg 76 of the other test contact 72 to the other of the legs 110 of the ground bracket body 94. This means for selectively connecting includes a pair of electrically conductive contact screws 114 housed in bores 116 in the block 70 and the contact screws 114 each including a lower end positioned between a leg 76 of the test contact 72 and a leg 110 of the ground bracket body 94. While the contact screws 114 could have other constructions, in the illustrated arrangement each of the contact screws is adapted to be rotatably housed in the circular bores 116 of the block 70 such that the contact screws are supported for rotation about the longitudinal axis of the bore 116. Means are also provided for supporting the contact screws 114 in the respective bores 116 while allowing rotation of the contact screws. In a preferred embodiment, the contact screws 114 each include a groove 118 surrounding the head of the screw and the internal wall of each bore 116 includes a circumferential rib 120 adapted to be housed in the groove 118 of the contact screws 114. The contact screws 114 can be forced or snap-fit into the bore 116 such that the circumferencial rib 120 is housed in the groove 118 surrounding the contact screw and so as to restrain the contact screw against movement in the direction of its longitudinal axis, but to permit rotation of the contract screw about its longitudinal axis.

The contact screws also each include a shaft portion 122 having a free end housed in a bore 124 in the ground disconnect block 70. The shaft portion 122 of each contact screw 114 carries a pair of lugs or ears 126 extending along opposite sides of the shaft portion. The lugs 126 are adapted to engage the spaced apart contacts 76 and 110 when the contact screw is in a first position as is shown in solid lines in FIG. 11, and thereby provide an electrical connection between the spaced contacts 76 and 110. When the contact screw is rotated 90° about its longitudinal axis to the position shown in phantom in FIG. 6, the lugs 126 move away from the spaced contacts 76 and 110 and thereby break the electrical connection between the spaced contacts.

In a preferred form of the invention, and as illustrated in FIGS. 11 and 12, the legs or contacts 76 and 110 are shaped so as to include a generally concave or indented surface 128 facing the contact screw 114. When a contact screw 114 is in the solid line position shown in FIG. 11, the indented surface 128 of the contact functions as a detent to releasably restrain the contact screws 114 in this position.

In a preferred form of the invention, detent means will also be provided for releasably restraining a contact screw in the position shown in phantom in FIG. 11. In the illustrated construction, a pair of indentations 130 are formed in the ground disconnect block 70 on opposite sides of the contact screw 114 and are adapted to house the edges of the lugs 126 when the contact screw 114 is in the phantom position in FIG. 11.

In operation of the ground disconnect block arrangement described above, if it is desired to test the continuity of the electrically conductive shields surrounding the telephone cable 20, the serviceman can rotate the contact screws 114 90° from the solid line position shown in FIG. 11 to the phantom position wherein the electrical connection between the legs 76 and 110 is broken, thereby disconnecting the ground strap 48 from the ground rod 28. The serviceman can then connect a test device to the selected projecting test point 84 and measure the continuity of the cable shield.

As previously stated, the ground disconnect block is particularly constructed so as to be conveniently mounted to, for example, the face plate 36 of an encapsulating splice housing described above. In a preferred form of the invention, the face plate of the encapsulating splice housing is conveniently provided with one or more rectangular openings 52 adapted to house a rearwardly projecting portion 134 (FIG. 9) of the ground disconnect block 70. The rearwardly projecting portion 134 of the ground disconnect block 70 is inserted through the rectangular opening 52, and in the illustrated arrangement, the ground disconnect block 70 is provided with a flange 136 adapted to engage the rearward surface of one edge of the rectangular opening of the face plate 36.

While the ground disconnect block 70 could be secured to the face plate in various ways, in the illustrated construction, the ground disconnect block is also held against the face plate 36 by the bolt 105 connecting the ground rod bracket 104 to the ground clamp body 94. This bolt 105 can extend through a bore into the face plate 36 to secure the ground block 70 in place.

Referring now to the function of the ground bracket 92, the illustrated service wires 22 can comprise conventional telephone service wires, each including a plurality of insulated wires 138 bundled together and surrounded by an extruded or braided shield 140 comprised of electrically conductive material, the shield being adapted to be connected to a ground and being intended to protect the wires of the service wires 22 from electrical interference. The electrically conductive shield 140 of each wire 22 is in turn surrounded by an insultative jacket 142. A portion of this insulative jacket 142 of each of the service wires 22 is removed to expose the electrically conductive shield 140.

The ground bracket assembly 92 also includes a compression member 96 supported by the bracket body 94 and adapted to clamp bundles of service wires 22 together such that the electrically conductive shield 140 of those wires 22 are forced together in electrically conductive relation and so as to be suitably connected to the ground body 94 which is, in turn, connected to the ground rod 28 and such that the shields 142 are all at a common electrical potential and joined to an electrical ground. The compression member 96 and the bracket body 94 provide a means for clamping a selected number of service wires 22 together in fixed disposition and causing the shields 142 of those wires to be clamped together in electrical contact so as to be at a common potential and to provide for electrical connection between the shields 142 and an electrical ground.

In a preferred form of the invention, and as previously stated, the ground bracket body 94 is fabricated of a highly conductive metal such as brass in sheet or strip form, this sheet metal being stamped or otherwise bent to form a configuration as illustrated in FIGS. 9≧12. More particularly, while the ground bracket body 94 may have other configurations depending upon the intended use of the bracket 94 and its selective environment or support structure, in the illustrated arrangement, the end of the bracket body adapted to clampingly house the service wires defines a pair of forwardly opening channels 146. Each forwardly opening channel 146 is comprised of a rearward wall or base portion 148 having a forward surface and a pair of sidewalls 150 projecting forwardly from the rear wall 148 at right angles. The forwardly projecting ends of the sidewalls 150 of adjacent channels 146 are integrally joined by a transverse connecting boss or web 152. The transverse web 152 includes a central tapped bore 154 adapted to threadably house a screw or bolt 156. While the compression member 96 could be constructed in various ways, in one form of the invention, the compression member 96 is formed from a stamped metal strip of the same type of highly conductive metal sheet material as is employed in forming the ground bracket body 94. The compression member 96 is generally U shaped or Omega shaped, as shown in FIGS. 9 and 10, and includes a pair of generally parallel spaced apart legs 158. The legs 158 are particularly adapted to be slideably received in the channels 146 such that the compression member 96 is movable forwardly and rearwardly with respect to the ground bracket body 94. The legs 158 are integrally joined at their forward ends to a connecting portion or central boss 160. This central boss includes a bore (not shown) adapted to house bolt 156. The bore is larger in diameter than the bolt 156 such that the bolt is freely rotatable in the bore. When the legs 158 of the compression member are housed in the cavities, the legs 158 are adapted to be positioned closely adjacent to the sidewalls 150, but spaced from the sidewalls such that compression member 96 is freely slideably moveable. The free ends or rearwardly extending ends of the legs 158 of the compression members also each include a jaw member 164 which extends transVersely from that leg and outwardly therefrom toward the opposed sidewall 150 of the bracket body 94. The jaw members 164 each have a free end adapted to be positioned closely adjacent a sidewall 150 but spaced from the sidewall such that the compression member 96 is freely moveable toward and away from the ground bracket body 94.

In the illustrated construction, means are also provided for stabilizing the compression member 96 as it engages the ground bracket body 94. This means is shown as including a pair of upper and lower tabs or ears 166 integrally joined to the upper and lower edges of the boss 160 and extending rearwardly therefrom such that they will slide over the upper and lower edges of the web 152 and the sidewalls of the channels 150.

In operation of the ground bracket assembly, the outer insulative jacket 142 of each of the service wires 22 is removed to expose a length of the electrically conductive shield 140. The compression members 96 are retracted to a position such that the service wires 22 can be inserted into the channels 146 between the jaws 164 and the sidewalls 150 of the bracket body 94. Several such service wires 22 are bunched and placed between the sidewalls 150 of the channels 146. The bolt 156 is then tightened to cause the compression member 96 and the jaws 164 to engage the service wires 22 and to clamp the service wires against the rearward walls 148 thereby clamping the electrically conductive shields 140 of the service wires 22 together and clamping those shields 140 against the bracket body 94 to effectively ground the shields of the service wires 22. In a preferred form of the illustrated embodiment of the invention, the threads at the end of the bolt 156 projecting through the threaded bore can be upset to prevent removal of the bolt 156 from the bracket body 94 and to restrict the range of movement of the associated compression member 96. In this arrangement, once the bolt 94 is threaded through the bore in the ground bracket body 94 and the threads at the end of the bolt 156 are upset, the compression member 96 will have limited movement with respect to the bracket body 94. It is intended that the compression member 96 be moveable forwardly only sufficiently that service wires 22 may be freely inserted between the ends of the jaws 164 and the forward ends of the sidewalls 150.

One of the features of the invention is that the service wires 22 can be inserted into the ground bracket assembly 92 from the front or a forward portion of the bracket assembly, and the bolt 156 for tightening the compression member against the bracket body is similarly accessible from the forward portion of the bracket assembly. Accordingly, the ground bracket assembly embodying the invention does not require the operator to reach behind the bracket assembly to insert the service wires. Another advantage of the ground bracket assembly 92 is that the bracket assembly can be secured to a flat surface such as the face plate 36 of the encapsulating splice housing 12 since access to a rearward portion of the bracket assembly is not required. This advantage permits use of the ground bracket in combination with the ground disconnet block 50 as described above, and also facilitates mounting of the ground disconnect block 50 on the forward surface of the face plate 36. Other principal advantages of the ground bracket assembly 92 described above are that it can be easily manufactured, it includes a minimum number of component parts, and it can be constructed of strip stock and other components which are readily available.

The construction of the ground disconnect block 50 and the ground bracket assembly 92 in the manner described above have the further advantage of providing a convenient means for connecting the electrically conductive shields of both the services wires and the telephone cable to a ground wire 28 with a minimum number of components and with a minimum labor required. Another advantage of the construction of the ground disconnect block 50 is that it facilitates the employment of the encapsulating splice housing 12. Since the ground disconnect block 50 permits the testing of the continuity of the cable shields without requiring access to the cables themselves, the splice housing 12 can be filled with encapsulant to thereby protect the cable splice components and protect the electrical continuity of the splice. The use of the encapsulant in the splice housing functions to provide a positive means for maintaining good housekeeping of the splice. Furthermore, the use of the encapsulating splice housing 12 filled with encapsulant prevents moisture from gaining access to the splice and also bars damage to the splice by insects or rodents. The encapsulant also keeps the electrical connections free of other contaminates such as dust, dirt, and corrosion, and further protects the conductor insulation from ultraviolet and thermal degradtion.

A further advantage of the use of the encapsulating splice housing 12 which is in turn facilitiated by the employment of the ground bracket 92 and ground disconnect block 50 described above is that once the splicer has completed the connection of the selected wire pairs of the cable to the terminals of the terminal block 24 and when he has closed the encapsulating splice housing and filled the housing with encapsulant, any further access to the wire pairs of the cable 20 is precluded. Accordingly, during connection by a second serviceman of the service wires 22 to the terminal block 24, the serviceman is required to connect the proper service wires 22 to the proper terminals of the terminal block 24. This feature prevents shortcuts by the serviceman during the installation process.

Various features of the invention are set forth in the following claims.

I claim:

1. A splice housing adapted to be contained in a telephone distribution pedestal and for housing a loop of telephone cable such that the loop of cable in the splice housing can be encapsulated, the splice housing comprising
    a body portion defining a cavity for housing the loop of telephone cable,
    a face plate joined to said body portion, said face plate including a forward surface adapted to support a terminal block, and said face plate being joined to said body portion for movement with respect to said first clam shell portion between an open position wherein the interior of the said body portion is accessible and a closed position wherein said body portion and said face plate define a closure containing the cable therein and adapted to contain liquid encapsulant poured into the splice housing and to encapsulate the cable.

2. A splice housing as set forth in claim 1 wherein said body portion includes means for separating said splice housing cavity into a pair of cavity portions, one portion of the cavity housing being adapted to house one leg of the cable loop and the other portion of the cavity housing is adapted to house the other leg of the cable loop.

3. A splice housing as set forth in claim 1 wherein said face plate and said body portion are integrally joined together.

4. A splice housing as set forth in claim 2 wherein said face plate and said body portion are comprised of a single sheet of formed plastic sheet material.

5. A splice housing as set forth in claim 1 wherein said face plate and said body portion are comprised of a formed plastic sheet.

6. A splice housing as set forth in claim 1 wherein the pedestal includes a rear wall and spaced sidewalls, said sidewalls including forward edges, and wherein said face plate is hinged to said body portion, said connection of said face plate and said body portion being adjacent a forward edge of one of said pedestal sidewalls.

7. A splice housing as set forth in claim 1 wherein said face plate is comprised of a flexible plastic material adapted to be pierced with a sharp instrument so as to provide apertures for mounting terminal blocks.

8. Apparatus adapted to be housed in a telephone distribution pedestal housing a loop of cable, the cable including an electrically conductive shield, and housing service wires including electrically conductive shields, the apparatus comprising
    a splice housing adapted to be housed in the pedetal and adapted to contain the loop of telephone cable such that the loop of cable can be encapsulated, the splice housing including
    a first clam shell portion defining a cavity for housing the loop of telephone cable, and
    a face plate joined to said first clam shell portion, said face plate including a forward surface adapted to support a terminal block, and said face plate being joined to said first clam shell portion for movement between an open position wherein the interior of said clam shell portion is accessible and a closed position wherein said first clam shell portion and said face plate define an enclosure,
    a ground disconnect block mounted on said forward surface of said face plate, said ground disconnect block including a first electrical contact member adapted to be electrically connected to said electrically conductive shield of said cable and means for electrically connecting said first electrical contact member to a ground means to ground said first electrical contact member.

9. Apparatus as set forth in claim 8 wherein said first electrical contact member includes a test contact positioned so as to be accessible from the forward surface of said face plate and adapted to be engaged by electrical test apparatus.

10. Apparatus as set forth in claim 8 wherein said means for electrically connecting said first electrical contact member to a ground means includes means for selectively interrupting electrical connection of said first electrical contact member and the ground means.

11. Apparatus as set forth in claim 10 wherein said means for selectively interrupting electrical connection of said first electrical contact member and the ground means includes a rotatable contact supported by said ground disconnect block for movement from a first position wherein said rotatable contact provides electrical connection between said first electrical contact member and the ground means and a second position interrupting said electrical connection.

12. Apparatus as set forth in claim 11 wherein said ground disconnect block is comprised of molded plastic and includes a central aperture, and wherein said rotatable contact is housed in said central apperture and rotatable about a central longitudinal axis between a first position providing electrical connection between said first electrical contact member and said ground means and a second position.

13. Apparatus as set forth in claim 8 and further including means for electrically connecting the electrically conductive shield of said cable to said first electrical contact member, said means for electrically connecting extending through said front plate.

14. Apparatus as set forth in claim 8 wherein said front plate includes an aperture housing at least a portion of said ground disconnect block.

15. Apparatus as set forth in claim 8 wherein said ground disconnect block further includes means for providing electrical connection of the electrically conductive shield of the service wires to the ground means.

16. Apparatus as set forth in claim 15 wherein said means for providing electrical connection of the electrically conductive shields of said service wire to the ground means includes a ground bracket assembly fixed to said ground disconnect block, said ground bracket assembly including a bracket body comprised of electrically conductive material, said bracket body being electrically connected to the ground means, and means for clamping the electrically conductive shield of the service wires against the bracket body.

17. Apparatus as set forth in claim 16 wherein said ground bracket body is comprised of an electrically conductive formed metal strip, said formed metal strip being shaped so as to form a pair of forwardly opening U-shaped channels, each of said channels including a rearward wall portion having opposite ends and a surface for supporting cables, and a pair of side walls integral with said rearward wall portion and extending forwardly from said rearward wall portion, the forward end of one of said side walls of one of said channels being joined by a web to a forward end of one of said side walls of an adjacent one of said channels, said web including a bore, and wherein said means for clamping includes a compression member including a pair of spaced parallel legs, one of said legs being adapted to be insertable into one of said channels, said one of said legs including an end adapted to engage cables housed in said one of said channels and to force them together and against said ground bracket body and a second leg adapted to be inserted into the other of said channels, said second leg having an end adapted to engage said cables in said second channel and to force them together and against said ground bracket body, and means for forcing said respective ends into said channels to compress the cables therein.

18. Apparatus as set forth in claim 17 wherein said compression member is comprised of a U-shaped metal strip, said legs each being generally planar and said legs being joined by a transverse portion, said transverse portion having a central bore.

19. Apparatus as set forth in claim 17 wherein said means for forcing said respective ends toward said rearward wall portion includes a screw extending through said transverse portion and threadably housed in said bore in said web, said screw including a head adapted to engage said transverse portion whereby said head forces said transverse portion of said compression member toward said web when said screw is threaded through said bore in said web.

20. Apparatus as set forth in claim 17 wherein said compression member is comprised of a U-shaped metal strip, and wherein said legs are each generally planar, one of said legs being slidably supported adjacent one of said side walls of one of said channels and said end of said one of said legs defining a compression jaw transverse to said one of said legs and extending between said spaced side walls of said one channel.

21. Apparatus adapted to be housed in a telephone distribution pedestal housing a loop of cable, the cable including an electrically conductive shield, and the pedestal housing service wires including electrically conductive shields, the apparatus comprising a splice housing adapted to be housed in the pedestal and adapted to contain the loop of telephone cable such that the loop of telephone cable can be encapsulated, the splice housing including a first clam shell portion defining a cavity for housing at least a portion of the loop of telephone cable and a face plate joined to said first clam shell portion, said face plate including a forward surface adapted to support a terminal block, and said face plate being joined to said first clam shell portion for movement between an open position wherein the interior of said clam shell portion is accessible and a closed position wherein the first clam shell portion and the face plate define an enclosure, a ground clamp mounted on said forward surface of said face plate, said ground clamp including an electrically conductive ground clamp body secured to said face plate, means for connecting said ground clamp body to a ground means to ground said ground clamp body, and means for clamping the electrically conductive shield of said service wires to said ground clamp body.

22. Apparatus as set forth in claim 21 wherein said ground clamp body is comprised of an electrically conductive formed metal strip, said formed metal strip being shaped so as to form a pair of forwardly opening U-shaped channels, each of said channels including a rearward wall portion having opposite ends and a surface for supporting cables, and a pair of side walls integral with said rearward wall portion and extending forwardly from said rearward wall portion, the forward ends of one of said side walls of one of said channels being joined by a web to a forward end of an adjacent side wall of an adjacent channel, said web including a bore, and wherein said means for clamping includes a compression member including a pair of spaced parallel legs, one of said legs being adapted to be insertable into one of said channels, said one of said legs including an end adapted to engage cables housed in said one of said channels and to force them together and against said ground bracket body and a second leg adapted to be inserted into the other of said channels, said second leg having an end adapted to engage said cables in said second channel and to force them together and againt said ground bracket body, and means for forcing said respective ends into said channels to compress the cables therein.

23. Apparatus as set forth in claim 22 wherein said compression member is comprised of a U-shaped metal strip, said legs each being generally planar and said legs being joined by a transverse portion, said transverse portion having a central bore.

24. Apparatus as set forth in claim 22 wherein said means for forcing said respective ends toward said rearward wall portion includes a screw extending through said transverse portion and threadably housed in said bore in said web, said screw including a head adapted to engage said transverse portion whereby said head forces said transverse portion of said compression member toward said web when said screw is threaded through said bore in said web.

25. Apparatus as set forth in claim 22 wherein said compression member is comprised of a U-shaped metal strip, and wherein said legs are each generally planar, one of said legs being slidably supported adjacent one of said side walls of one of said channels and said and of said one of said legs defining a compression jaw transverse to said one of said legs and extending between said spaced side walls of said one channel.

* * * * *